Oct. 26, 1948.   E. M. ROTHEN   2,452,494
PULL POINT CONNECTION DEVICE
Filed Oct. 28, 1947    3 Sheets-Sheet 1

Inventor
Edward M. Rothen
By his attorneys
Howson and Howson

Inventor
Edward M. Rothen
By his attorneys
Howson and Howson.

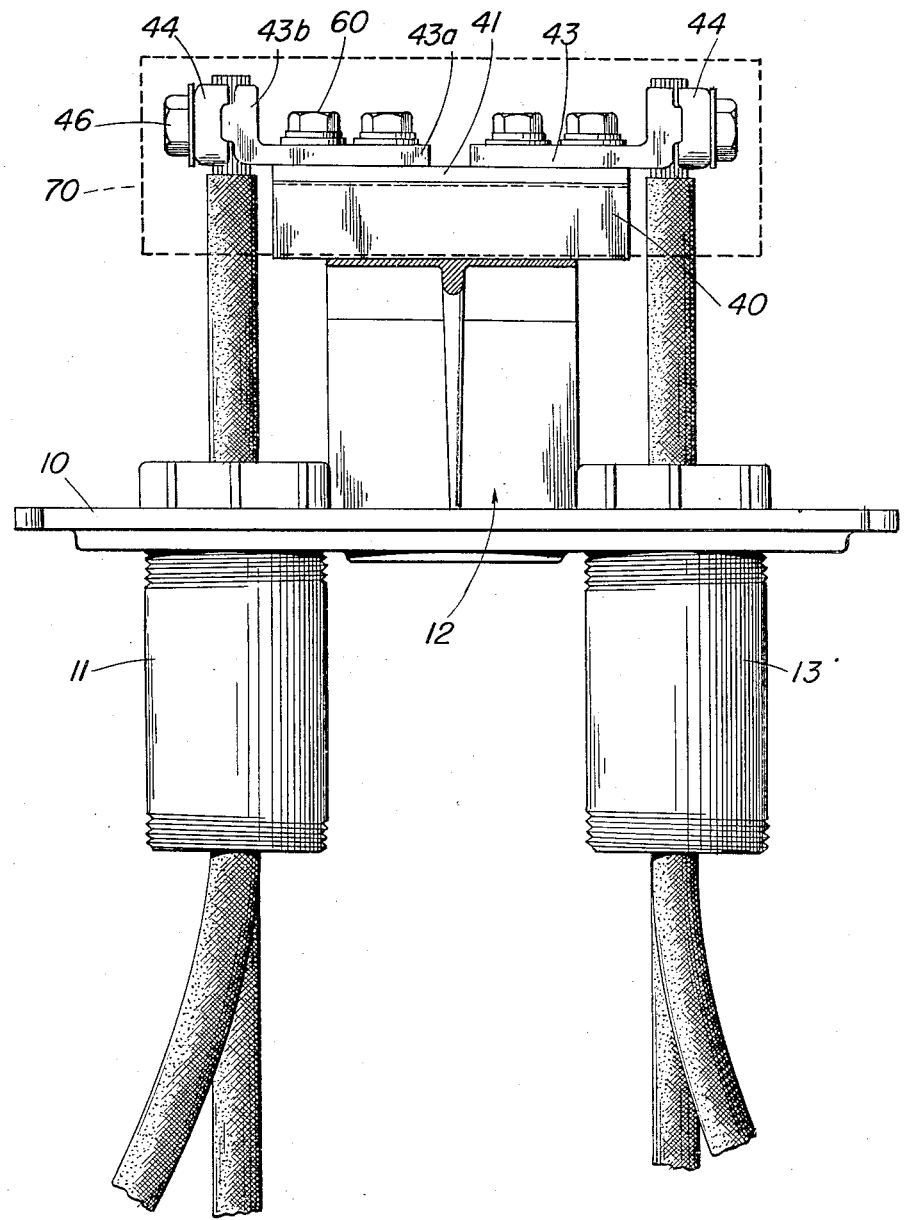

UNITED STATES PATENT OFFICE 2,452,494

PULL POINT CONNECTION DEVICE

Edward M. Rothen, Bloomfield, N. J., assignor to Russell & Stoll Company, Inc., New York, N. Y., a corporation of New York Application October 28, 1947, Serial No. 782,633

5 Claims. (Cl. 174—59)

This invention relates to electric connection boxes, particularly of the type used for connecting insulated electric cables or wires of the larger sizes, such as #6 or larger. The larger size cables can be conveniently handled only in limited lengths; and for that and other reasons it is necessary to join them at various points. In extending an underground electric network it is desirable to have the pull points or junctions above ground instead of connections in manholes.

The desirability of above ground pull points is particularly emphasized when the installation is located at near sea level and wires and connections are exposed to water seepage or damp conditions.

In certain plants, such as oil refineries for example, and out of doors in other plants as well as refineries, it is essential to have the junctions enclosed in waterproof and flameproof housings; and in any case, an enclosure is required over the exposed current carrying parts.

In making connections between lengths of heavy cables in the conventional manner as heretofore practiced, the cable was led into the box or enclosure from below and thereafter was bent about 90°. The bend had to be on a large arc, depending on the thickness of the cable, so as not to overstress or break the insulation. The Underwriters' specifications in this regard are specific and must be complied with. Actually, in the conventional connection box of this sort, the connections were made after the bend and when the wire ends were in parallelism or alignment. Because of that, and because the cables entered from below or through the bottom of the enclosure, the bend was necessary and its size required the box or housing to be large. In a conventional box, even though large, considerable difficulty is also experienced in pulling cables due to the obstruction of the side walls of the box. The large housing required a large amount of space, which, when multiplied by a large number of boxes in a battery or row, introduced added problems of space requirements; beside that, the larger boxes increased the costs of manufacture and installation.

The present invention enables reduction in these costs, simplifies installation and requiring no bends in the cable, obviates the necessity for using large sized enclosures. It provides a compact device less than half the size of the conventional pull or junction box, thus reducing space requirements. The means for accomplishing these desirable advantages will be described in connection with the accompanying drawings.

In the drawings:

Fig. 3 is a side elevation view of the device in Fig. 1;

Figure 1:
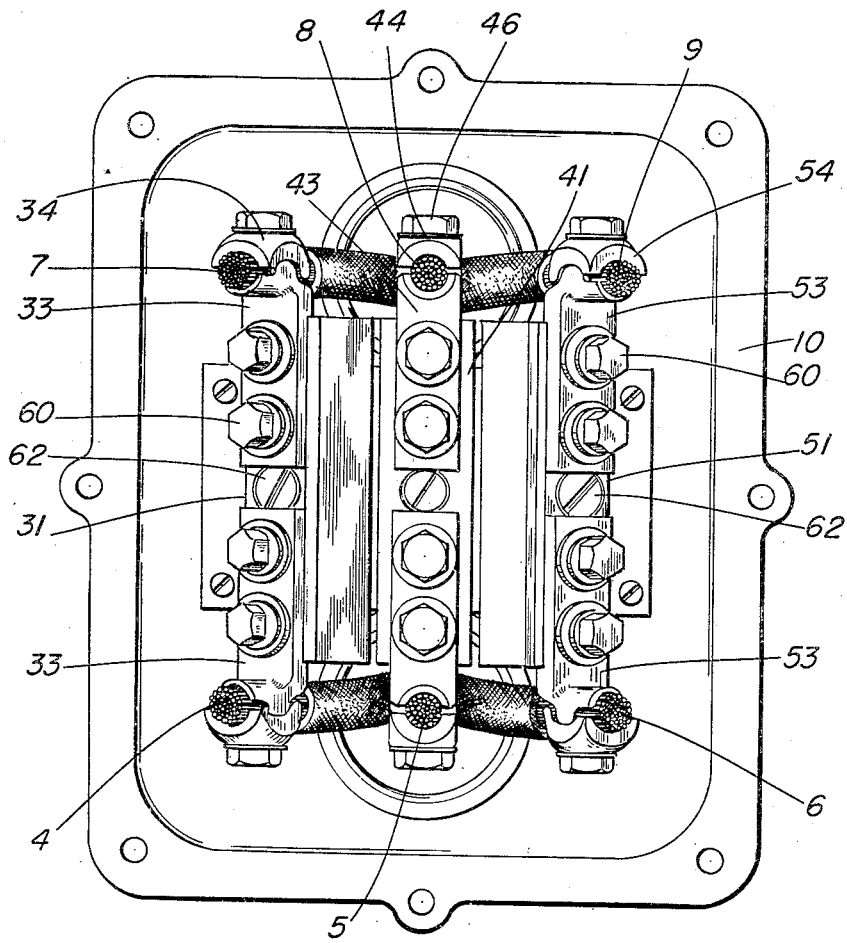
Fig. 1 is a top plan view of the invention.
Figure 2:
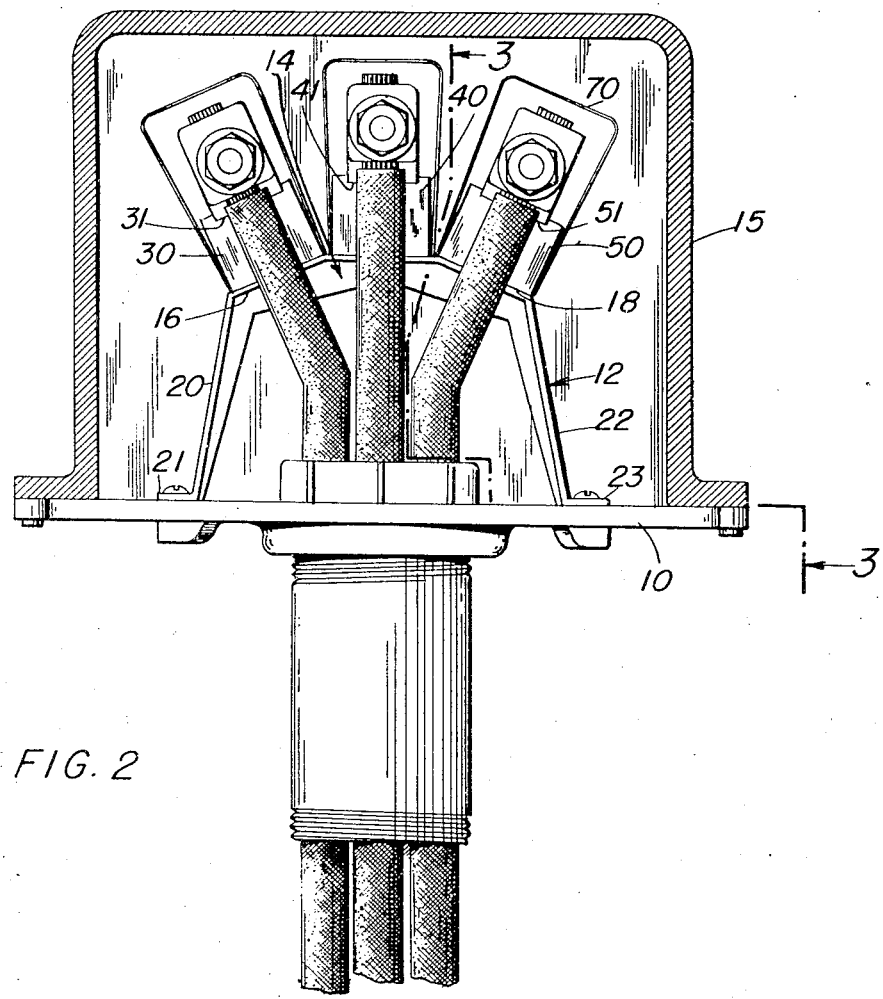
Fig. 2 is an end view of the device of Fig. 1.

Referring to the drawings, the connecting elements of the invention are housed within a hollow metal cover casing 15 having a base plate or bottom wall 10 closing the housing in a waterproof or gas-tight manner or in the manner required to meet the particular conditions under which the invention is to be used. The cover and base may be of aluminum or other metal or material, as required.

In the plate 10, near opposite ends, are two openings into which are threaded conduits raceways or pipes 11 and 13 through which may pass conductors or heavy wire cables. As illustrated, three cables 4, 5 and 6 pass through the conduit 11 and three other cables 7, 8 and 9 pass through the conduit 13.

Mounted upon the inside or top surface of the plate 10 is a supporting saddle or member, having a horizontal top central portion 14 from which are inclined sideways and downwardly in opposite directions the top side portions 16 and 18. The portions 16 and 18 join the side supporting walls 20 and 22 which are or may be substantially vertical. Feet 21 and 23 may be outturned from the bottom edges of the vertical sides 20 and 22 so as to lie upon and afford means for securing the saddle to the plate 10.

Supported upon the horizontal top central portion 14 and the obliquely inclined side portions 16 and 18 is insulating supporting means. This means may take the form of three separate identical insulating blocks 30, 40 and 50 of substantially rectangular form; but the blocks may be integral. In the top surface of each block are shallow channels to receive heavy conductive bars or plates 31, 41 and 51 respectively. These bars or plates may run for the full length of the insulating blocks or nearly so and may be secured in said channels in the insulating blocks by screw bolts 62 whose heads are countersunk into said blocks. By sinking these bars or plates in channels in the blocks only one screw bolt will suffice to hold each bar or plate and to keep it from turning. Upon opposite ends of each of the bars or plates 31, 41 and 51 are identical terminal members, for example, 33, 43 and 53, each having a bar shaped portion, such as for example 43a, lying upon the conductive bar or plate 41 and secured thereto by one or more bolts 60 passing through the bar portion 43 into the conductive bar or plate 41. Each terminal member also has, at one end, an upstanding terminal portion, such as 43b, which is or may be concave in shape and engaged by a clamping member, such as 44, the similar clamping members of the terminals 33 and 53 being identified by the reference numerals 34 and 54. A clamping bolt, such as 46 for example, may secure the clamped member 44 to the terminal part 43b.

It will be noted that the inclination of the top side portions 16 and 18, upon which are supported the insulating blocks 30 and 50, causes the terminal members 33 and 53 to be spaced from the terminal members 44 further than would be possible were not such side portions thus inclined. Furthermore, it will be noted that the terminal portions of the terminal members 33, 43 and 53 projecting in opposite directions. Thus, there is provision for the conductors or cable ends to be clamped between the clamp members and the terminal portions of the terminal members 33, 43 and 53 at spaced points so as to provide adequate air and over-surface insulation. At the same time it is necessary only to slightly deflect the outside cables 4 and 6 (or 7 and 9 as the case may be) in order to have them clamped in the terminal members 33 and 53. In carrying out the invention, such deflection need not be greater than 30° from the normal vertical direction and hence is within the tolerance allowed by the Underwriters' specifications for wires and cables having insulation coverings.

In order to protect the conductive terminal parts from accidental contact by the cover or housing, there are preferably provided individual hoods, such as 70, of insulating material over each of the sets of terminals of the separate poles or lines of the device. These hoods may be of molded, fibrous or other suitable insulating material and may be of such length as to extend beyond the clamp portions of the terminals. In form, the hoods are preferably of channel or U-shape and may be somewhat flexible so as to permit their side walls to be expanded slightly and to firmly frictionally grip the sides of the insulating blocks 30, 40 and 50. In order to more firmly secure the hoods to the blocks, securing means, such as conventional screws may be employed, if desired.

It thus becomes apparent that the invention has provided for the connection and pulling of heavy or large size wires or cables to connector means within a closed housing without the necessity of bending the wires or cables in the usual large bends but with no more than a 30° deflection from the normal straight line direction. By the novel arrangement of the parts and the simple form and combination thereof the invention makes possible a considerable saving in material and in the over-all size of the apparatus and at the same time it facilitates pulling, assembling and connection of the cables to the terminal connectors thus economizing in labor.

Certain variations in the specific form and arrangement of the invention will occur to those skilled in the art, it being not limited to a three wire system but adaptable to two or more wires, equally as well. Therefore it is not limited to the specific embodiment and arrangement of parts as illustrated in the drawings.

I claim:

1. The combination for connecting the ends of large size electric insulated cables and, conductors, comprising a metallic plate apertured near each end for passage of a plurality of large insulated conductors, a supporting saddle mounted on said plate, said saddle having portions of its top surface inclined obliquely downwardly toward the side walls of the saddle, individual insulating blocks of substantially rectangular form affixed to said inclined surfaces, conductive bar members affixed to the top surfaces of said blocks and running between the ends of said blocks, terminal members at each end of each bar member and extending beyond the end adjacent the conductor-entrance apertures in said plate, means to secure the bared ends of conductors as they enter through said apertures in a straight line or at a deflection from a straight line not exceeding about 30° to said extending portions of said terminal members.

2. The combination as claimed in claim 1 wherein the insulating blocks have channels in their upper surfaces in which said bar members are received, and a single securing means holding each bar member in its channel non-rotatably.

3. The combination for connecting the ends of large size electric insulated cables, and conductors, comprising a metallic plate apertured near each end for passage of a plurality of large insulated conductors, a supporting saddle mounted on said plate, said saddle having a horizontal top-central portion with side portions which incline obliquely downwardly on opposite sides thereof to the side walls of the saddle, individual insulating blocks of substantially rectangular form affixed to said top-central and said inclined surfaces, conductive bar members affixed to the top surfaces of said blocks and running between the ends of said blocks, terminal members at each end of each bar member and extending beyond the end adjacent the conductor-entrance apertures in said plate, means to secure the bared ends of conductors as they enter through said apertures in a straight line or at a deflection from a straight line not exceeding about 30° to said extending portions of said terminal members.

4. The combination claimed in claim 1 having a hollow metal housing with which said plate cooperates to enclose completely the conductive parts, and individual hood members of insulation engaging each insulating block to cover and protect the conductive parts that are mounted on the block against accidental contact by said cover.

5. The combination for connecting the ends of large size electric insulated cables and, conductors, comprising a metallic plate apertured near each end for passage of a plurality of large insulated conductors, an inverted U-shaped supporting saddle mounted on said plate, said saddle having portions of its top surface inclined obliquely downwardly toward the side walls of the saddle, insulating means affixed to said inclined surfaces, conductive bar members affixed to the top surfaces of said insulating means and running between the ends of said insulating means, terminal members at each end of each bar member and extending beyond the end adjacent the conductor-entrance apertures in said plate, means to secure the bared ends of conductors as they enter through said apertures in a straight line or at a deflection from a straight line not exceeding about 30° to said extending portions of said terminal members.

EDWARD M. ROTHEN.

REFERENCES CITED

The following references are of record in the file of this patent:

UNITED STATES PATENTS

| Number | Name | Date |
|---|---|---|
| 1,923,939 | Lavarack | Aug. 22, 1933 |
| 2,317,450 | Folds et al. | Apr. 27, 1943 |

FOREIGN PATENTS

| Number | Country | Date |
|---|---|---|
| 71,735 | Switzerland | July 1, 1916 |